US006826394B1

(12) United States Patent
Raith et al.

(10) Patent No.: US 6,826,394 B1
(45) Date of Patent: Nov. 30, 2004

(54) INTERACTION BETWEEN AN ADJUNCT POSITIONING SYSTEM AND A RADIOCOMMUNICATION SYSTEM

(75) Inventors: Alex K. Raith, Durham, NC (US); Rajaram Ramesh, Cary, NC (US); R. David Koilpillai, Apex, NC (US); Gregory E. Bottomley, Cary, NC (US); Havish Koorapaty, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1264 days.

(21) Appl. No.: 08/839,861

(22) Filed: Apr. 22, 1997

(51) Int. Cl.$^7$ .............................................. H04M 11/00
(52) U.S. Cl. ............................. 455/404.2; 455/343.1; 455/452.1; 455/456.1; 455/574
(58) Field of Search ............................... 455/404, 415, 455/445, 452–453, 464, 456, 343, 67.1, 38.3, 422, 450; 342/457

(56) References Cited

U.S. PATENT DOCUMENTS

| | | | | |
|---|---|---|---|---|
| 3,764,915 A | * | 10/1973 | Cox et al. ..................... | 455/452 |
| 4,977,589 A | * | 12/1990 | Johnson et al. ................ | 379/58 |
| 5,175,867 A | | 12/1992 | Wejke et al. ............... | 455/33.1 |
| 5,224,152 A | * | 6/1993 | Harte .......................... | 455/343 |
| 5,303,297 A | * | 4/1994 | Hillis .......................... | 455/456 |
| 5,327,144 A | * | 7/1994 | Stilp et al. ................... | 455/456 |
| 5,353,332 A | | 10/1994 | Raith et al. ................... | 379/59 |
| 5,377,256 A | * | 12/1994 | Franklin et al. ............ | 455/574 |
| 5,465,388 A | | 11/1995 | Zicker ........................ | 455/33.1 |
| 5,479,482 A | * | 12/1995 | Grimes ........................ | 455/404 |
| 5,499,386 A | | 3/1996 | Karlsson ..................... | 455/33.2 |
| 5,554,993 A | * | 9/1996 | Brickell ....................... | 342/357 |
| 5,603,095 A | * | 2/1997 | Uola .......................... | 455/67.1 |
| 5,666,655 A | * | 9/1997 | Ishikawa et al. ............ | 455/452 |
| 5,678,229 A | * | 10/1997 | Seki et al. ................... | 455/127 |
| 5,805,992 A | * | 9/1998 | Schellinger ................. | 455/410 |

FOREIGN PATENT DOCUMENTS

EP  737953  10/1996

OTHER PUBLICATIONS

Louis A. Stilp, "Time Difference of Arrival Technology for Locating Narrowband Cellular Signals", Proceedings of the SPIE, vol. 2602, pp. 134–144 (1996).

* cited by examiner

*Primary Examiner*—Lee Nguyen
(74) *Attorney, Agent, or Firm*—Myers Bigel Sibley & Sajovec PA

(57) ABSTRACT

Emergency call handling may, in the near future, require terminal unit location information to be provided to emergency service centers. Exemplary embodiments of the present invention provide techniques which provide for interaction between an adjunct system whose primary function is to provide terminal unit location information and the radiocommunication system. For example, the location information generated by the adjunct system can be used by the radiocommunication system for other purposes, e.g., dynamic channel allocation.

9 Claims, 4 Drawing Sheets

INTERACTION BETWEEN AN ADJUNCT POSITIONING SYSTEM AND A RADIOCOMMUNICATION SYSTEM

BACKGROUND

Applicants' invention relates generally to radiocommunication systems, e.g., cellular or satellite systems and, more particularly, to techniques for supporting and enhancing emergency calling procedures in such systems.

The growth of commercial radiocommunications and, in particular, the explosive growth of cellular radiotelephone systems have changed the ways in which people communicate. One survey indicates that about 80% of the people who purchase mobile communication units and service subscriptions do so to enhance their personal security. Presumably, many of these subscribers would expect to use their mobile units to aid them in urgent situations, e.g., when their vehicle has become disabled or in an emergency situation requiring rapid medical and/or police response. In these circumstances it would be desirable that the radiocommunication system be able to independently determine a location of the mobile unit, particularly in the case where the subscriber does not know his or her precise location. Moreover, it is expected that the FCC will soon require that network operators forward the position of an emergency caller to the emergency service provider.

There are many techniques available to generate mobile unit location information. In a first category, the mobile unit could estimate its own position and send a message with its coordinates when placing an emergency call. This could be accomplished by, for example, providing the mobile unit with a Global Positioning System (GPS) receiver that receives location information from the GPS satellite network. The mobile unit can then transmit this information to the system, which would then forward it to the emergency service provider. This requires, however, significant modification of existing mobile units to include GPS receivers, as well as additional signalling between the mobile units and base stations.

Alternatively, the base stations which transmit signals to, and receive signals from, the mobile units could be used to determine the mobile unit's location. Various techniques, including attenuation of a mobile unit's signal, angle-of-arrival, and difference between the time-of-arrival (TDOA) of a mobile unit's signal at different base stations, have been suggested for usage in providing mobile unit location information. See, for example, the article entitled "Time Difference of Arrival Technology for Locating Narrowband Cellular Signals" by Louis A. Stilp, SPIE Vol. 2602, pp. 134–144. These solutions also have their drawbacks including the need to modify the many existing base stations, e.g., to provide array antennas to support angle-of-arrival techniques or to synchronize base station transmissions to support TDOA techniques.

A third category of strategies for locating mobile units in radiocommunication systems involves the provision of an adjunct system, i.e., a system which may be completely independent of the radiocommunication system or which may share various components (e.g., an antenna) with the radiocommunication system but which processes signals separately therefrom. This may be advantageous, for example, as an expedient solution to providing mobile unit location without modifying the large number of existing base stations in a system. For example, consider the equipment illustrated in FIG. 1 wherein the adjunct scanning units are not co-located with the base stations of radiocommunication system. Therein, a base station 1 supports radiocommunication within cell 2 and, in particular with mobile unit 3. An adjunct system, partially shown by way of scanning units 4, 5 and 6, monitors accesses to the system by mobile unit 3. When mobile unit 3 makes an emergency access, adjunct units 4, 5 and 6 can detect this emergency access by, for example, the presence of a set emergency flag in an origination message or based upon the dialed number. The adjunct units can then use the mobile unit's transmissions on either a control channel or a traffic channel to provide information to a location processing center 7. The location processing center then uses the information provided by the various adjunct units to, for example, triangulate the position of mobile unit 3 and report this position to an emergency service center 8. More details regarding exemplary usages of adjunct systems can be found in U.S. Pat. No. 5,327,144 to Stilp et al., entitled "Cellular Telephone Location System", the disclosure of which is incorporated here by reference.

If such an adjunct system is overlaid with existing radiocommunication systems, e.g., cellular systems, it may be possible to provide certain adjustments to the operation of the radiocommunication system which enhance operation of the adjunct system. Similarly, the radiocommunication system may be able to take advantage of the adjunct system to enhance its performance.

SUMMARY

According to one exemplary embodiment of the present invention, position information generated by an adjunct system is used by the radiocommunication system to avoid localized congestion caused by many mobile units reporting the same emergency. For example, if a traffic peak occurs, the radiocommunication system can evaluate incoming emergency calls using the position information generated by the adjunct system. If a number of emergency calls are received from the same location when the system is relatively congested, then the radiocommunication system can reduce the priority of incoming emergency calls from that location. Similarly, the position information generated by the adjunct system can be used by the radiocommunication system for other purposes, e.g., dynamic channel allocation.

According to another exemplary embodiment of the present invention, the radiocommunication system can render it easier for the adjunct system to refine its position estimate for a mobile unit and/or to follow a mobile unit to its assigned traffic channel for an emergency call. This can be accomplished by repeating the transmission of a traffic channel assignment message on the control channel which the mobile unit is using to make the emergency access.

According to another exemplary embodiment of the present invention, the mobile unit can also adopt certain practices in response to its placement of an emergency call. For example, it can enter a mode in which its transmissions are tailored to aid the adjunct system, e.g., transmitting with maximum or high power, having no encryption of its data messages, or continuously transmitting. Alternatively, the mobile unit can enter a low power mode wherein it reduces battery drain (e.g., by entering discontinuous transmission mode, using lower transmit power, etc.) and transmits an indication of the amount of battery power/talk time left.

BRIEF DESCRIPTION OF THE DRAWINGS

The features and advantages of Applicants' invention will be understood by reading this description in conjunction with the drawings, in which.

DETAILED DESCRIPTION

The following description is scripted in terms of a cellular radiotelephone system, but it will be understood that Applicants' invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, while the exemplary embodiments described below are provided in the context of Time Division Multiple Access (TDMA) communication systems, it will be understood by those skilled in the art that the present invention may be applied to systems using any access methodology, e.g., Frequency Division Multiple Access (FDMA), Code Division Multiple Access (CDMA) and hybrids of FDMA, TDMA and/or CDMA.

Consider, solely for the purposes of example, the prevalent digital cellular radiotelephone system in North America known as the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVCs) and TDMA digital traffic channels (DTCs), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

The IS-54-B standard also provides for a number of analog control channels (ACC) on which system accesses can be initiated and system overhead information can be communicated to the mobile units. A subsequent standard, referred to as IS-136, adds specifications for digital control channels (DCCs), which standard is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. According to IS-54B and IS-136, each TDMA frame consists of six consecutive time slots and has a duration of 40 milliseconds (msec). Thus, each frame can carry from one to six channels (e.g., one to six radio connections), which may be a mixture of DTCs and DCCs used to convey information between a base station and a mobile station.

Figure 2:
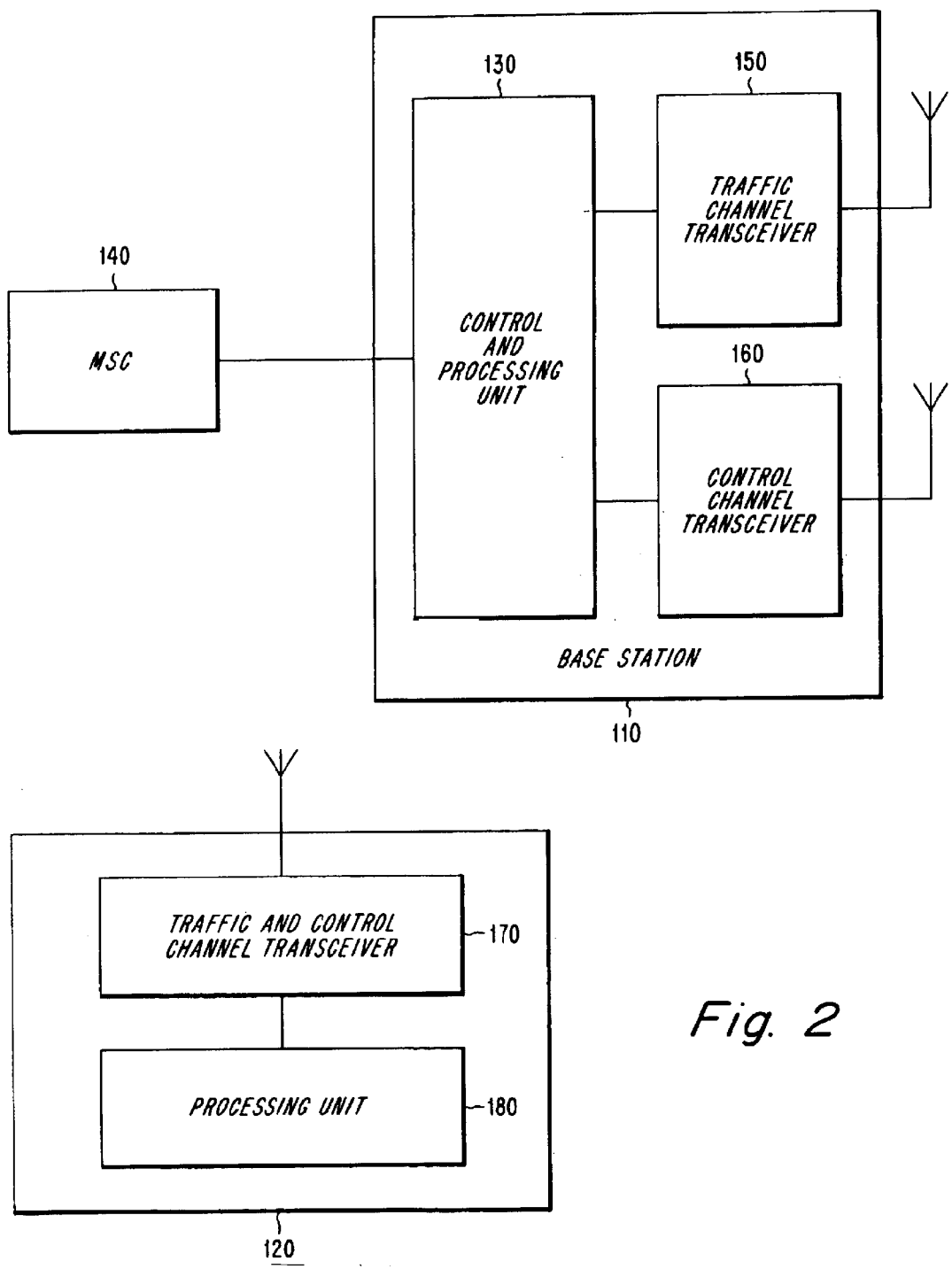
FIG. 2 illustrates an exemplary base station and mobile unit which may operate in accordance with the present invention.

FIG. 2 represents a block diagram of an exemplary cellular mobile radiotelephone system, including an exemplary base station 110 and mobile unit 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

The base station 110 handles a plurality of traffic channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170 in the mobile station, for use with control channels and traffic channels that share the same radio carrier frequency.

After an idle mobile unit 120 has located a control channel, e.g., by using digital control channel location information found on a traffic channel, it can then read the control information transmitted on that control channel, e.g., paging messages, using its traffic and control channel transceiver 170. For more detailed information relating to techniques for locating digital control channels, the reader is referred to U.S. patent application Ser. No. 08/331,711 entitled "Method and Apparatus for Locating a Digital Control Channel in a Radiocommunication System", filed on Oct. 31, 1994, the disclosure of which is incorporated here by reference. When a connection between the mobile station 120 and the system is desired, the transceiver 170 will tune to a traffic channel assigned thereto by the system.

Once the mobile unit has found a control channel which satisfies a minimum set of rules, e.g., the mobiles must be able to receive the channel above a minimum received signal strength, the mobile may further evaluate this control channel with regard to certain system preferences stored in the mobile unit. For example, if the cell is barred (as described in IS-136), or the cellular operator is not the preferred operator (using the System Operator Code in IS-136), the mobile unit may then try to find another control channel.

If the data broadcast by the cellular system on the control channel (this part of the DCC is often referred as to the Broadcast Control Channel or BCCH) satisfies the preferences stored in the mobile unit, the mobile unit will listen or lock to this control channel to listen for paging messages and/or transmit call origination messages. At the same time, however, the mobile unit prepares for potential cell reselection since the mobile may be traveling and leaving the coverage area of the first selected control channel. Many known techniques exist for informing a mobile unit where (e.g., using one or more of frequency, time, and code) the neighboring control channels can be found in order for mobile units to test and compare these candidates with the current control channel to find the best control channel to serve the mobile unit given its current position. See, for example, U.S. Pat. No. 5,353,332 to Raith and Muller, entitled "Method and Apparatus for Communication Control in a Radiotelephone System" or U.S. Pat. No. 5,499,386, entitled "Best Server Selection in Layered Cellular Radio System" to Karlsson, the disclosures of which are incorporated here by reference.

When a mobile unit wishes to make an emergency access, it will do so by sending an access message over an uplink of the control channel to which it is currently listening. If an emergency occurs, for example an automobile accident, one can readily envision that a number of people may try to make an emergency phone call, e.g., by dialing 911, at roughly the same time in roughly the same geographical area. This scenario would create sudden traffic peaks which might completely use up the resources of a cellular system serving this area.

Figure 1:
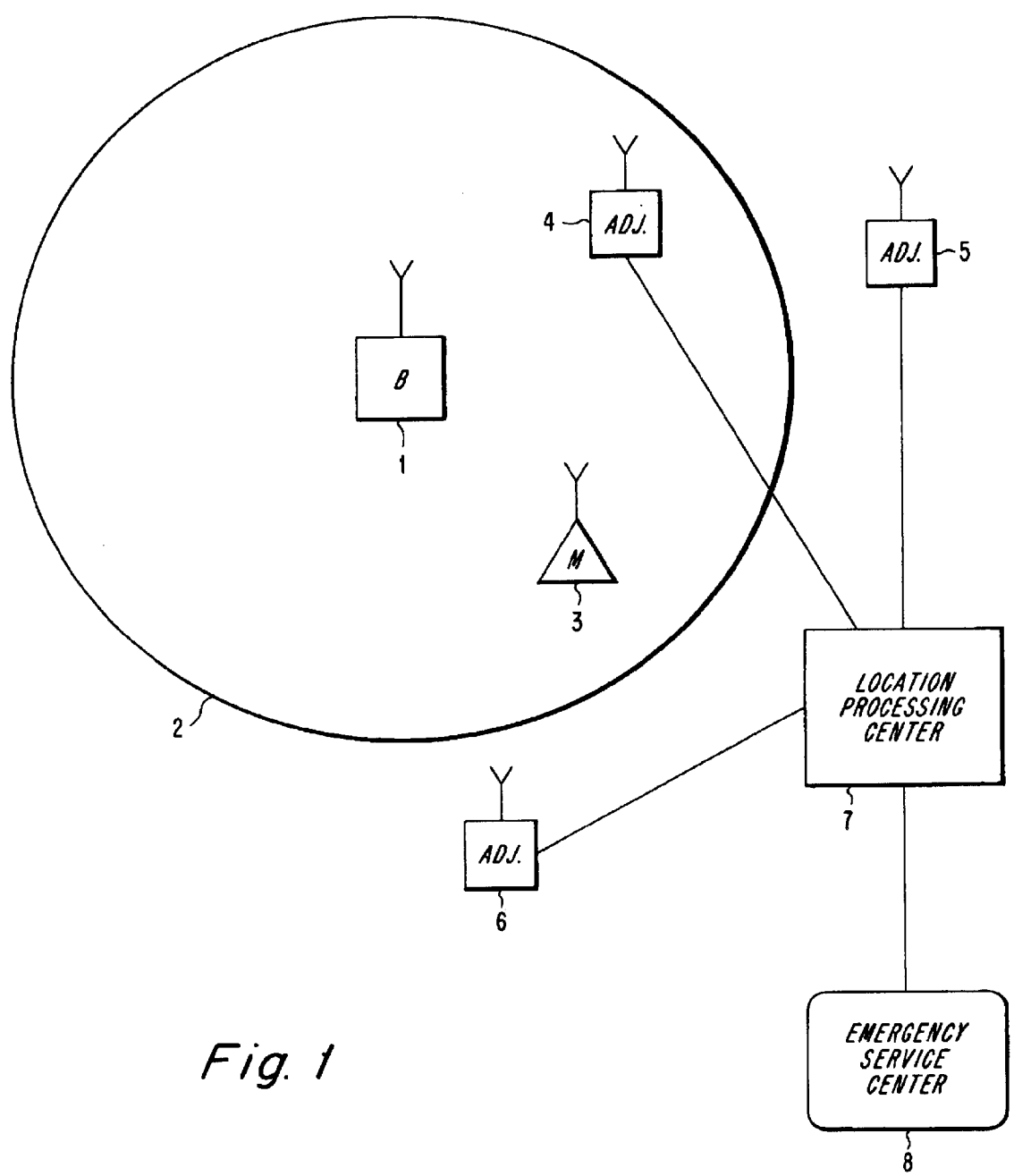
FIG. 1 is a diagram of an exemplary cellular radio telephone system having an adjunct monitoring system for providing mobile unit information to an emergency service center in which the present invention may be applied.
Figure 3:
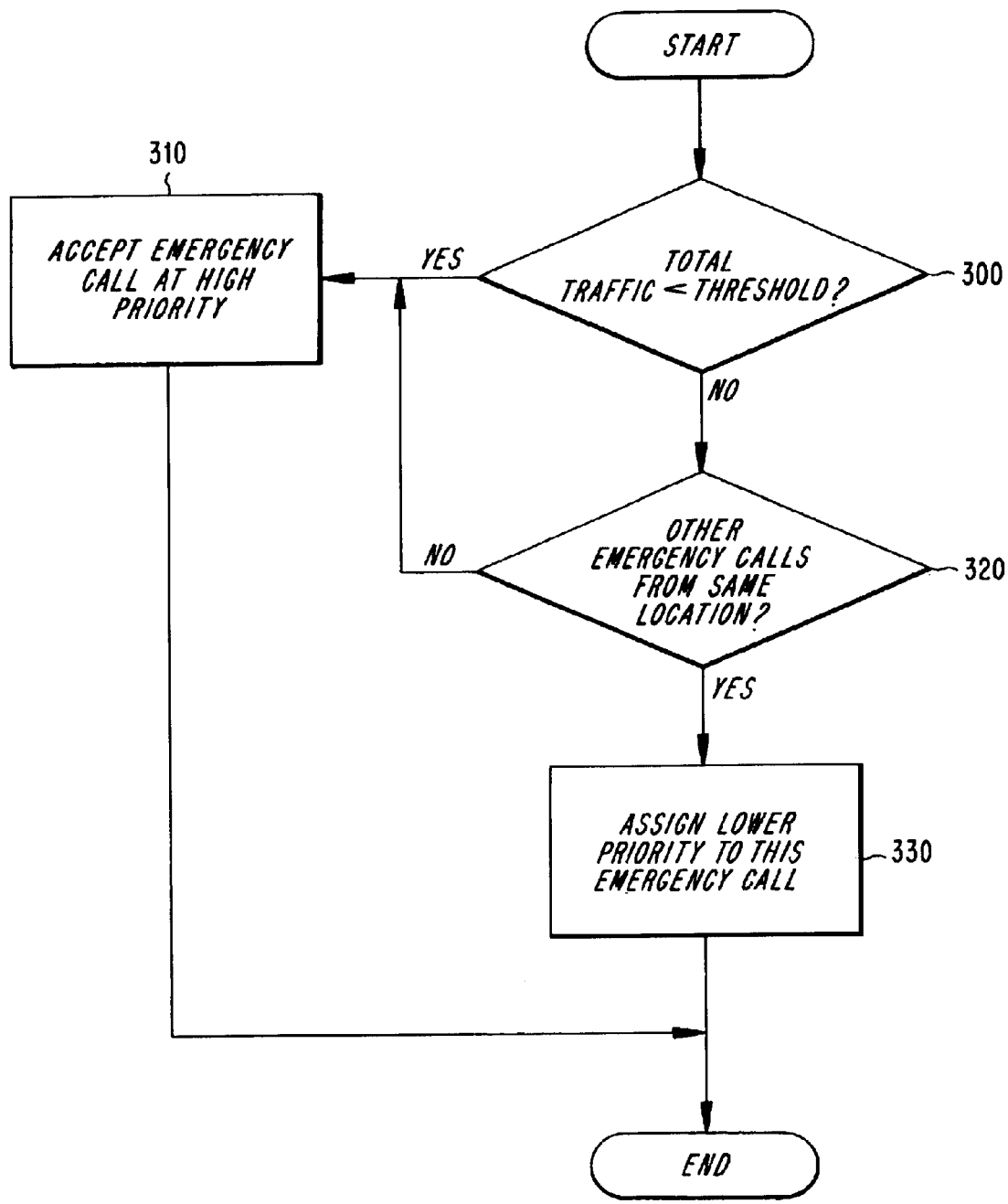
FIG. 3 is a flow chart illustrating a first exemplary embodiment of the present invention.

Accordingly, considering again the system of FIG. 1, an exemplary embodiment of the present invention provides a technique whereby the position information generated by the adjunct system 4-7 can be used to prioritize emergency calls to provide a more efficient usage of a system's bandwidth. For example, with reference to the flow chart of FIG. 3, when an emergency call is received by the cellular system, i.e., when the system receives an access request wherein an emergency flag is set or a dialed number is an emergency number, the radiocommunication system (as represented by base station 1) checks to see whether the current traffic in this area exceeds some predetermined threshold at step 300. If not, then the radiocommunication system will process the emergency call normally, i.e., as a high priority, at block 310 by assigning the emergency call to a traffic channel.

Otherwise, the flow proceeds to block 320 where the radiocommunication system uses the position information forwarded by the adjunct system to determine whether the radiocommunication system is currently handling other calls from the same location. If not, then this emergency call is treated normally, again at block 310. If the radiocommunication is handling some predetermined number of emergency calls (e.g., 2, 3 or 5 calls) from the same general location, then it may be safe to assume that the current emergency call is intended to relay the same or similar emergency information. Accordingly, this emergency call can be assigned a lower priority at block 330 for subsequent processing, e.g., traffic channel assignment, so that these and other emergency calls associated with the same emergency do not usurp all of the available bandwidth.

Analogously, if the radiocommunication system can query the adjunct system to obtain its position information, then the radiocommunication system may use this information for various other purposes. Examples include fleet management and dynamic radio resource allocation (i.e., the assignment of radio channels to various sectors or cells based upon the geographical distribution of mobile units).

In addition to the radiocommunication system making use of the adjunct system, there are various actions which the radiocommunication system can take to aid the adjunct system in its task of locating mobile units. For example, according to one exemplary embodiment of the present invention, the radiocommunication system may repeat a mobile unit's traffic channel assignment message numerous times so that the adjunct system has a better chance of properly receiving the traffic channel assignment and being able to monitor the mobile unit's transmissions on the traffic channel. This could be accomplished in several ways. For example, the radiocommunication system could proactively transmit the traffic channel assignment message in reaction to an emergency access from a mobile unit. Alternatively, the mobile unit could purposely delay transmitting on its assigned traffic channel, thereby causing the radiocommunication system to retransmit the traffic channel assignment message. By delaying the mobile unit's transition to the traffic channel, the adjunct system would have additional time to refine its position estimate, particularly if it is not equipped to follow the mobile station to its assigned traffic channel.

Figure 4:
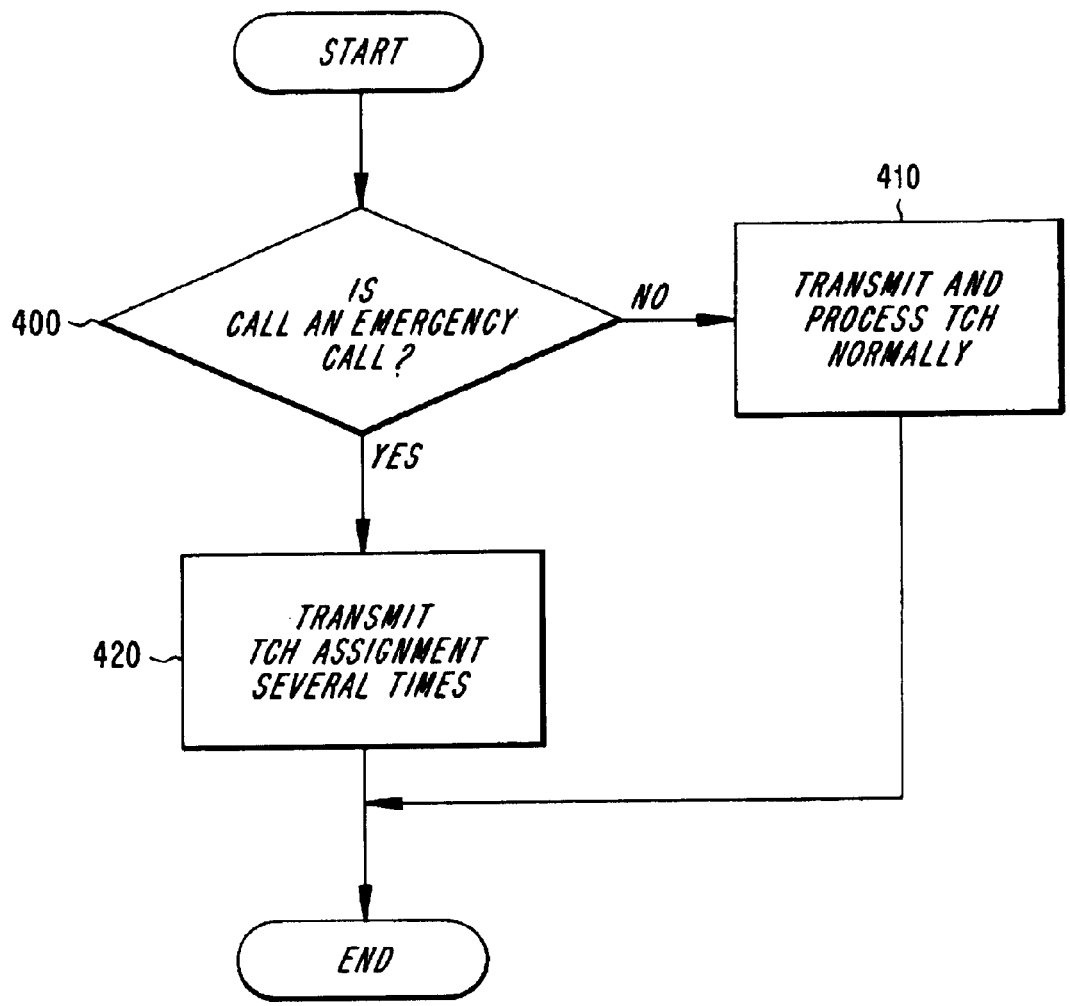
FIG. 4 is a flow chart illustrating a second exemplary embodiment of the present invention.

These exemplary embodiments of the present invention are summarized by way of the flow chart of FIG. 4. Therein, it is first determined whether a particular call is an emergency call at block 400. Exemplary techniques for identifying a call as an emergency or non-emergency call are described in U.S. patent application Ser. No. 08/839,860, entitled "Systems and Methods for Identifying Emergency Calls in a Radiocommunication System" to Raith et al., filed on the same date as the above-identified application, the disclosure of which is incorporated here by reference. If the call is not an emergency call, then traffic channel assignment transmission by the base station and processing in the remote unit are performed normally at block 410. Otherwise, at block 420, the traffic channel assignment message is transmitted several times, e.g., responsive to the mobile unit's failure to transmit on the assigned traffic channel or simply by the system proactively performing this task.

The radiocommunication system can take other actions to facilitate emergency call handling, generally, and operation of the adjunct system, specifically. For example, the adjunct system may record or forward speech associated with an emergency call in addition to position information, as described, for example in U.S. patent application Ser. No. 08/840,590, entitled "Systems and Methods for Locating Remote Units Operating in a Radiocommunication System Using an Adjunct System" to Raith et al., filed on Apr. 22, 1997, the disclosure of which is incorporated here by reference. Under these circumstances, the radiocommunication system may not activate any encryption on the traffic channel so that the adjunct system can more readily process the detected speech thereon.

Furthermore, the mobile unit may be ordered to not activate its "Discontinuous Transmission" (DTX) feature. As is well known to those skilled in the art, DTX is a function which powers down the mobile transmitter when it has detected that no speech is present. However, continuous transmission may be useful because, in some situations, it may be beneficial to the emergency center to listen in when there is only sound in the background. For example, the user may have requested an emergency call because he or she may subject to an assault and may therefore not be able to speak, but the emergency center may still pick up a weak conversation in the background.

The mobile unit may further be requested to transmit with full power, or otherwise alter the nominal transmit power rules set forth according to the applicable protocols for the system in which it operates. This technique enhances the reception quality of the emergency call and minimizes the possibility that the emergency call will be lost. Alternatively, the cellular base station may continuously monitor the received power from the mobile unit and invoke a different power control algorithm both for its own transmit power, i.e., the downlink, and for the mobile unit's transmit power, i.e., the uplink, using the normal power command messages typically found in any wireless standard. One exemplary strategy for this alternate power control algorithm is to request a higher margin for both the cellular base station and the mobile unit.

The mobile unit may also adopt certain strategies in recognition of an emergency call being placed. For example, a mobile unit which has identified an emergency request can implement techniques designed to reduce its battery drain as much as possible. Although this strategy may not be compatible with the strategy described above where the mobile unit itself, or by commands from the cellular bases station, transmits messages associated with the emergency call at a higher power level than those used for a regular call. However, a benefit of this strategy is to avoid the emergency call being dropped because of battery drain. Power saving techniques which could be implemented include allowing the mobile unit to enter DTX mode upon recognizing that an emergency call is to be transmitted even if the default setting for normal calls transmitted by the mobile is DTX off. However, it may not be desirable that the mobile unit enter DTX mode if the default rules dictate that the mobile unit be in DTX mode off and the base station, through explicit signaling, has allowed this since this particular base station may not be equipped to handle DTX mode enabled.

Additionally, the mobile unit may send an estimate of its remaining talk time to the radiocommunication system in a signaling channel, such as the slow associated control channel (SACCH) channel in IS-136. This information can be forwarded by the cellular system and/or the adjunct system to the emergency center.

It is, of course, possible to embody the invention in specific forms other than those described above without departing from the spirit of the invention. Thus, the embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A radiocommunication system comprising:
   means for receiving signals transmitted by a remote unit;
   means for identifying emergency calls to produce an emergency indicator;
   means for transmitting a traffic channel assignment message a number of times; and
   means for increasing said number of times in response to said emergency indicator.

2. The system of claim 1, wherein said means for identifying emergency calls evaluates an emergency field in an access message received by said receiving means.

3. The system of claim 1, wherein said means for identifying emergency calls evaluates a dialed number to determine whether to produce said emergency indicator.

4. A method for using position information generated by an adjunct system in a radiocommunication system comprising the steps of:
   receiving an emergency call;
   determining if traffic in said radiocommunication system has exceeded a predetermined threshold;
   if so, determining if said emergency call was generated by a remote unit having approximately a same location as a predetermined number of earlier received emergency calls; and
   if so, reducing a priority associated with said emergency call.

5. A method for using position information generated by an adjunct system in a radiocommunication system comprising the steps of:
   receiving, from said adjunct system, position information associated with a plurality of mobile units operating in said radiocommunication system; and
   using, by said radiocommunication system, said position information to perform dynamic channel allocation, wherein channels are allocated to fixed transceivers within said radiocommunication system for assignment to support connections between said fixed transceivers and said mobile units.

6. A method for handling an emergency call in a radiocommunication system comprising the steps of:
   identifying a call as an emergency call; and
   transmitting a traffic channel assignment message a plurality of times in response to said identifying step so as to allow an adjunct positioning system to locate a remote unit associated with said emergency call.

7. The method of claim 6, wherein said step of identifying further comprises the steps of:
   identifying, in said remote unit, said call as said emergency call; and
   failing to transmit on an assigned traffic channel in response thereto so as to cause said step of transmitting.

8. The method of claim 6, wherein said step of identifying further comprises the steps of:
   identifying, in a base station, a call as said emergency call.

9. A method for handling an emergency call in a radiocommunication system comprising the steps of:
   identifying, in said system, a call as said emergency call;
   transmitting, from said system, an indication to a mobile unit which is associated with said emergency call to transmit with at least one of: maximum power, continuous transmission and unencrypted data; and
   wherein said indication commands said mobile unit to transmit with each of maximum power, continuous transmission and unencrypted data.

* * * * *